United States Patent [19]

Schierling et al.

[11] Patent Number: 5,569,088
[45] Date of Patent: Oct. 29, 1996

[54] TWO MASS FLYWHEEL FOR A MOTOR VEHICLE TRANSMISSION HAVING A SEPERATE THRUST BEARING BETWEEN THE TWO MASSES

[75] Inventors: Bernhard Schierling, Kürnach; Ralf Till, Euerbach; Jörg Sudau, Niederwerrn, all of Germany

[73] Assignee: Fichtel & Sachs AG, Schweinfurt, Germany

[21] Appl. No.: 322,598

[22] Filed: Oct. 13, 1994

[30] Foreign Application Priority Data

Oct. 15, 1993 [DE] Germany .............. 43 35 2073

[51] Int. Cl.⁶ .................................. F16F 15/12
[52] U.S. Cl. .................................. 464/64; 464/68
[58] Field of Search ................... 464/24, 66, 67, 464/68, 64; 192/106.2, 55.4, 208, 212, 214; 74/574

[56] References Cited

U.S. PATENT DOCUMENTS

| | | |
|---|---|---|
| 2,880,626 | 4/1959 | Nallinger . |
| 3,097,537 | 7/1963 | Peterson . |
| 4,674,991 | 6/1987 | Tojima et al. ............ 464/68 X |
| 4,848,551 | 7/1989 | Caspar .................... 464/68 X |
| 5,030,166 | 7/1991 | Wörner et al. ........... 464/68 X |
| 5,048,658 | 9/1991 | Reik ......................... 464/24 X |
| 5,083,981 | 1/1992 | Förster ..................... 464/68 |
| 5,180,335 | 1/1993 | Maucher et al. ......... 464/68 X |
| 5,356,339 | 10/1994 | Bochot et al. ........... 464/68 X |

FOREIGN PATENT DOCUMENTS

| | | |
|---|---|---|
| 2633683 | 1/1990 | France . |
| 3425161 | 1/1986 | Germany . |
| 8815924 | 5/1989 | Germany . |
| 3841639 | 12/1989 | Germany . |
| 4117584 | 12/1991 | Germany . |

*Primary Examiner*—Daniel P. Stodola
*Assistant Examiner*—Eileen A. Dunn
*Attorney, Agent, or Firm*—Nils H. Ljungman and Associates

[57] ABSTRACT

A two-mass flywheel has a first flywheel which can be connected to the crankshaft of an internal combustion engine, and can be provided with a thrust bearing for a hub of a second flywheel. The first flywheel can also be designed in its circumferential area with a radial bearing for the hub. The second flywheel can preferably rotate in synchronization with the first flywheel and can also preferably execute a limited rotation relative to the first flywheel. On this flywheel device, the thrust bearing is oriented so that on one hand, a sufficient supply of lubricant to the thrust bearing is always provided, and on the other hand, so that there is an optimal axial guidance of the hub. The invention teaches that this object can be achieved by a thrust bearing with displacement limit stops for the hub provided on both sides of the hub and extending to the radial bearing.

20 Claims, 7 Drawing Sheets

TWO MASS FLYWHEEL FOR A MOTOR VEHICLE TRANSMISSION HAVING A SEPERATE THRUST BEARING BETWEEN THE TWO MASSES

BACKGROUND OF THE INVENTION

1. Field of the Invention

This invention generally relates to a two mass flywheel for a motor vehicle transmission. Such a two mass flywheel will typically have a first flywheel which can be connected to a crankshaft of an internal combustion engine, and the first flywheel can be configured to at least partially surround a hub which is a part of a second flywheel. The second flywheel can also have a portion which is connectable to a friction clutch for driving a transmission shaft. The first and second flywheels are configured to rotate in synchronization with one another, and can also generally be connected to one another in a manner which allows for a limited relative rotation between the two flywheels. The first flywheel can be provided with a thrust bearing for the hub and, in a circumferential area of the first flywheel, there can be a radial bearing for the hub.

2. Background Information

European Patent 0 476 707 A1 discloses a two mass flywheel, or a flywheel having two halves, wherein a first flywheel is connected to the crankshaft of an internal combustion engine. In the vicinity of its circumference, this first flywheel has a ring which projects laterally. On the inside of this ring there is a radial bearing for a hub, which hub can execute a limited relative rotation with respect to the first flywheel. This hub is also fastened to a second flywheel designed to hold, or engage, a clutch plate. The first flywheel, on its side facing the second flywheel, has a cover plate which supports a first thrust bearing for the hub and acts as a closure for a chamber surrounding the hub, which chamber is filled with grease. A second thrust bearing is located relatively close to the axis of rotation of the flywheels on a projection of the second flywheel which extends to the first flywheel.

The grease well of this flywheel device is designed so that the radial bearing is supplied with grease by means of a lubrication passage which runs between the first flywheel and the hub. Because the more centrally located thrust bearing is spatially separated from this lubrication passage, however, the supply of grease to the thrust bearing is less reliable, whereby the thrust bearing closer to the axis of rotation of the flywheels is affected in particular, because under the influence of centrifugal forces, the grease in the flywheel chamber is forced outwardly away from the axis of rotation. Consequently, significant wear of the thrust bearing can be expected.

On the known flywheel device, the two thrust bearings are located in an area of the hub which lies between the axis of rotation of the flywheels and the radial bearing. This positioning, however provides only a relatively small distance between at least one of the thrust bearing and the axis of rotation. Because of this small distance, the hub cannot be optimally supported against any wobbling motions initiated by the crankshaft of the internal combustion engine.

OBJECT OF THE INVENTION

The object of the present invention is to design a thrust bearing so that, on one hand, a sufficient supply of lubricant to the thrust bearing can essentially be guaranteed under all conditions, and on the other hand, so that optimal axial guidance for the hub can be possible.

SUMMARY OF THE INVENTION

The present invention teaches that this object can be achieved by providing a first flywheel which is connected to the crankshaft of an internal combustion engine, is provided with a thrust bearing for a hub, and is designed in its circumferential area with a radial bearing for the hub, and by providing a second flywheel which can rotate in synchronization with the first flywheel, and can execute a limited relative rotation with respect to the first flywheel, wherein a thrust bearing is preferably provided with displacement limit stops for the hub, which limit stops extend on both sides of the hub to the radial bearing.

The radial bearing is often disposed inside the grease well at the greatest possible distance from the axis of rotation. Thus, as a result of the location of the thrust bearing adjacent to the radial bearing, grease which is transported under the effect of centrifugal forces toward the radial bearing can also get into the axial bearing. As such, the grease also provides for the lubrication of the thrust bearing.

Further, as a result of the displacement limit stops of the thrust bearing which extend along both sides of the hub to the radial bearing, the hub can preferably also be guided in the vicinity of the circumference of the hub. Thus, the axial guidance can preferably be provided at the greatest possible distance from the axis of rotation of the flywheels. Then, any wobbling motions, which, for example, might be initiated by the crankshaft of the internal combustion engine, can be transmitted with reduced reaction forces. In other words, any wobble which might be initiated can be significantly less than an amount of wobble which would occur in flywheels having this thrust bearing more centrally disposed.

Some additional advantageous embodiments of such a flywheel in halves can be provided by a flywheel having a primary plate on the one side of the hub, a cover plate on the other side of the hub and a primary support which connects the primary plate to the cover plate. This support can preferably surround the two plates in a ring-shaped fashion. Such a configuration thereby forms an essentially disc-shaped chamber in which the hub can be located. This disc-shaped chamber preferably forms a grease well, which essentially surrounds the hub, for containing a substance having lubricating and damping properties, such as grease, to lubricate the thrust and radial bearings.

The primary support, which can then preferably be disposed circumferentially about the hub, can then preferably have, on its inside facing the hub, both the radial bearing and the thrust bearing. As such, the displacement limit stops of the thrust bearing can preferably be engaged on the hub in the radially outside peripheral area of the hub. With the above-discussed configuration, the thrust bearing and the radial bearing are located at least partly in the grease well.

Additional particularly simple embodiments of the thrust bearing, wherein the displacement limit stops of the thrust bearing are each preferably formed by a disc which can be centered on the radial bearing. Further, the displacement limit stops can each preferably be formed by a disc, which discs can preferably be centered on the inner edge of an encircling depression formed in the circumferential portion of the first flywheel.

In further alternate embodiments of the present invention, the elements designed for the axial support of the hub can also preferably be provided for radial support of the hub.

Accordingly, the bearing elements can then preferably absorb forces applied both in the axial direction and in the radial direction. One configuration of bearing elements which can provide for such dual support can preferably be provided by a thrust bearing which has a two piece shell, with each piece comprising a two-legged shell portion with a leg extending on each side of the hub. A first leg of each bearing portion can preferably run parallel to the side of the hub, and can then act as a displacement limit stop, and a second leg can encloses the hub on the radial end of the hub. Alternately, the thrust bearing could preferably have a U-shaped bearing part which preferably has a first portion for holding the hub radially. On this first portion, there can then preferably be, on both sides of the hub, a preferably molded leg which extends from the first portion to act as a displacement limit stop for the hub.

Additional advantageous embodiments of the present invention can preferably allow for the capacity of the thrust bearing for grease, and thus the dynamic behavior of the hub, to be predetermined. One embodiment which can enable the capacity for grease to be altered can preferably be provided by a thrust bearing in which the portion of the bearing running radially about the hub can preferably be interrupted by recesses running in the axial direction. Alternatively, the legs which are disposed along the faces, or sides of the hub can each preferably be interrupted by recesses oriented radially with respect to the axis of the hub. Still further, a combination of axial and radial recesses could be provided. The capacity of the thrust bearing for grease, and thus the dynamic behavior can then essentially be altered by changing the sizing of the recesses, and/or by changing the distance between each two segments.

Additionally, the thrust bearing can preferably be provided, on both sides of the hub, with segments which form the contact surface for the hub, and the hub, in the range of the thrust bearing can preferably have segments which form a contact surface.

Further details regarding the present invention are presented herebelow with reference to the accompanying drawings. It should be understood that when the word "invention" is used in this application, the word "invention" includes "inventions". that is, the plural of "invention". By stating "invention", the applicant does not in any way admit that the present application does not include more than one patentably and non-obviously distinct invention, and maintains the possibility that this application may include more than one patentably and non-obviously distinct invention. The Applicant hereby asserts that the disclosure of this application may include more than one invention, and, in the event that there is more than one invention, that these inventions may be patentable and non-obvious, one with respect to the other.

One aspect of the invention resides broadly in a flywheel for an internal combustion engine of a motor vehicle for transmitting mechanical rotary power from an internal combustion engine to a transmission, the flywheel comprising: a first flywheel portion and a second flywheel portion, the second flywheel portion being disposed adjacent the first flywheel portion; the first flywheel portion comprising apparatus for non-rotationally connecting the first flywheel portion to a crankshaft of an internal combustion engine; the first flywheel portion being rotatable about an axis of rotation, the axis of rotation defining a first axial direction parallel to the axis of rotation, and a second axial direction opposite to the first axial direction; the second flywheel portion being rotatable about the axis of rotation; apparatus for connecting together the first flywheel portion and the second flywheel portion for rotating the second flywheel portion with the first flywheel portion; the second flywheel portion comprising a peripheral portion disposed radially away from the axis of rotation; the first flywheel portion comprising thrust bearing apparatus for limiting axial movement of the second flywheel portion with respect to the first flywheel portion in both the first and second axial directions; and the thrust bearing apparatus being disposed adjacent the peripheral edge of the second flywheel portion.

Another aspect of the invention resides broadly in a flywheel for an engine, the flywheel comprising: a first flywheel portion for being non-rotationally connected to an output shaft of an engine; a second flywheel portion disposed adjacent the first flywheel portion; apparatus for connecting together the first flywheel portion and the second flywheel portion for rotating the second flywheel portion with the first flywheel portion; the first and second flywheel portions being rotatable about an axis of rotation, the axis of rotation defining a first axial direction parallel to the axis of rotation, and a second axial direction opposite to the first axial direction; the second flywheel portion comprising a peripheral portion disposed radially away from the axis of rotation, the peripheral portion defining a radius of the second flywheel portion; the flywheel further comprises thrust bearing apparatus for limiting axial movement of the second flywheel portion with respect to the first flywheel portion in both the first and second axial directions; the thrust bearing apparatus being disposed a distance from the axis of rotation; and the distance of the thrust bearing apparatus from the axis of rotation being greater than a substantial portion of the radius of the second flywheel portion.

A further aspect of the invention resides broadly in a flywheel device for transmitting mechanical rotary power from an internal combustion engine to a transmission, the flywheel device comprising: first flywheel apparatus and second flywheel apparatus, the second flywheel apparatus being disposed adjacent the first flywheel apparatus; the first flywheel apparatus comprising apparatus for non-rotationally connecting the first flywheel apparatus to a crankshaft of an internal combustion engine; the first flywheel apparatus being rotatable about an axis of rotation, the axis of rotation defining a first axial direction parallel to the axis of rotation, and a second axial direction opposite to the first axial direction; the second flywheel apparatus being rotatable about the axis of rotation; apparatus for connecting together the first flywheel apparatus and the second flywheel apparatus for rotating the second flywheel apparatus with the first flywheel apparatus; the second flywheel apparatus comprising a first axial side, a second axial side and a peripheral edge disposed radially away from the axis of rotation; the first flywheel apparatus having a portion disposed radially away from the axis of rotation and encircling the peripheral edge of the second flywheel apparatus; the portion of the first flywheel apparatus comprising: radial bearing apparatus for engaging the peripheral edge of the second flywheel apparatus for limiting radial movement of the second flywheel apparatus with respect to the first flywheel apparatus; and thrust bearing apparatus for engaging the first and second side portions of the second flywheel apparatus for limiting axial movement of the second flywheel apparatus with respect to the first flywheel apparatus in the first and second axial directions; the thrust bearing apparatus having a first bearing portion for engaging the first side of the second flywheel apparatus, and a second bearing portion for engaging the second side of the second flywheel apparatus; and the first and second bearing portions of the thrust bearing apparatus extending from the radial bearing apparatus radially inwardly toward the axis of rotation.

BRIEF DESCRIPTION OF THE DRAWINGS

The present invention is illustrated in greater detail below, with reference to the embodiments illustrated in the accompanying drawings, in which.

DESCRIPTION OF THE PREFERRED EMBODIMENTS

Figure 1:
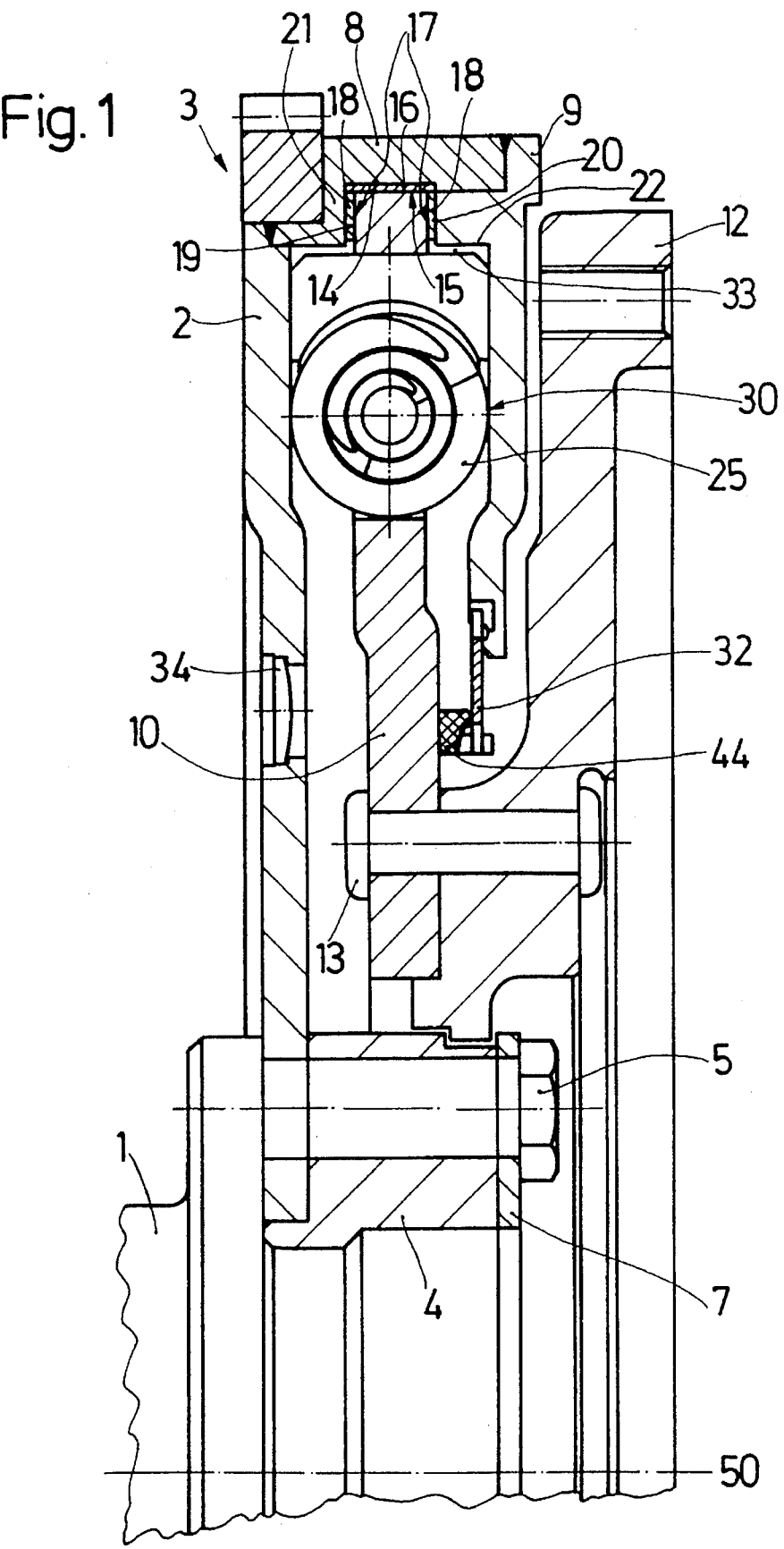
FIG. 1 shows a flywheel device in halves in partial longitudinal section, with a thrust bearing and a radial bearing on the first flywheel.

FIG. 1 shows a partial longitudinal section through a divided flywheel device, or two-mass flywheel for a motor vehicle. In the depicted embodiment, a primary plate 2 of a first flywheel 3 and a bearing flange 4 are fastened by means of screws 5 to a crankshaft 1, which crankshaft 1 would typically be a part of a motor vehicle engine (see 101 in FIG. 5). Between the bearing flange 4 and the heads of several screws 5 distributed over the circumference of the bearing flange 4, there can preferably be a plate 7 which distributes the force introduced by the heads of screws 5 to the contact surface of the bearing flange 4.

The primary plate 2 of the flywheel 3, in the vicinity of its circumference, can preferably support a ring-shaped primary support 8. This primary support 8 can preferably have an S-shaped cross section, and, on an end of the primary support 8 farther from the primary plate 2, a cover plate 9 can preferably be fastened. The primary plate 2, the primary support 8 and the cover plate 9, can thereby form a space 33. In this space 33 of the first flywheel 3, a hub 10 can preferably be located. This hub 10 can be fastened to a second flywheel 12. This second flywheel 12 can preferably be mounted rotationally about the bearing flange 4 by means of rivets 13, distributed radially about the circumference of the bearing flange 4, to connect the second flywheel 12 to hub 10.

The radial sizing of the hub 10 can essentially be selected so that the hub 10 is engaged, in its circumferential area, in a depression 14 made on the inside of the primary support 8. This depression 14 can preferably hold a radial bearing 15, which can be configured in the shape of a ring 16. This ring 16 can preferably follow the contour of the primary support 8. In addition, the depression can also preferably hold an axial, or thrust bearing 17, which axial bearing can be designed with displacement limit stops 18 for the hub 10, with one displacement limit stop 18 preferably on each side of the hub 10. These displacement limit stops 18 can each preferably be in the form of a disc 19, 20. As such, the disc 19 can come into contact laterally against a web 21 of the primary support 8, and the disc 20 can come into contact against a projection 22 of the cover plate 9.

Figure 1A:
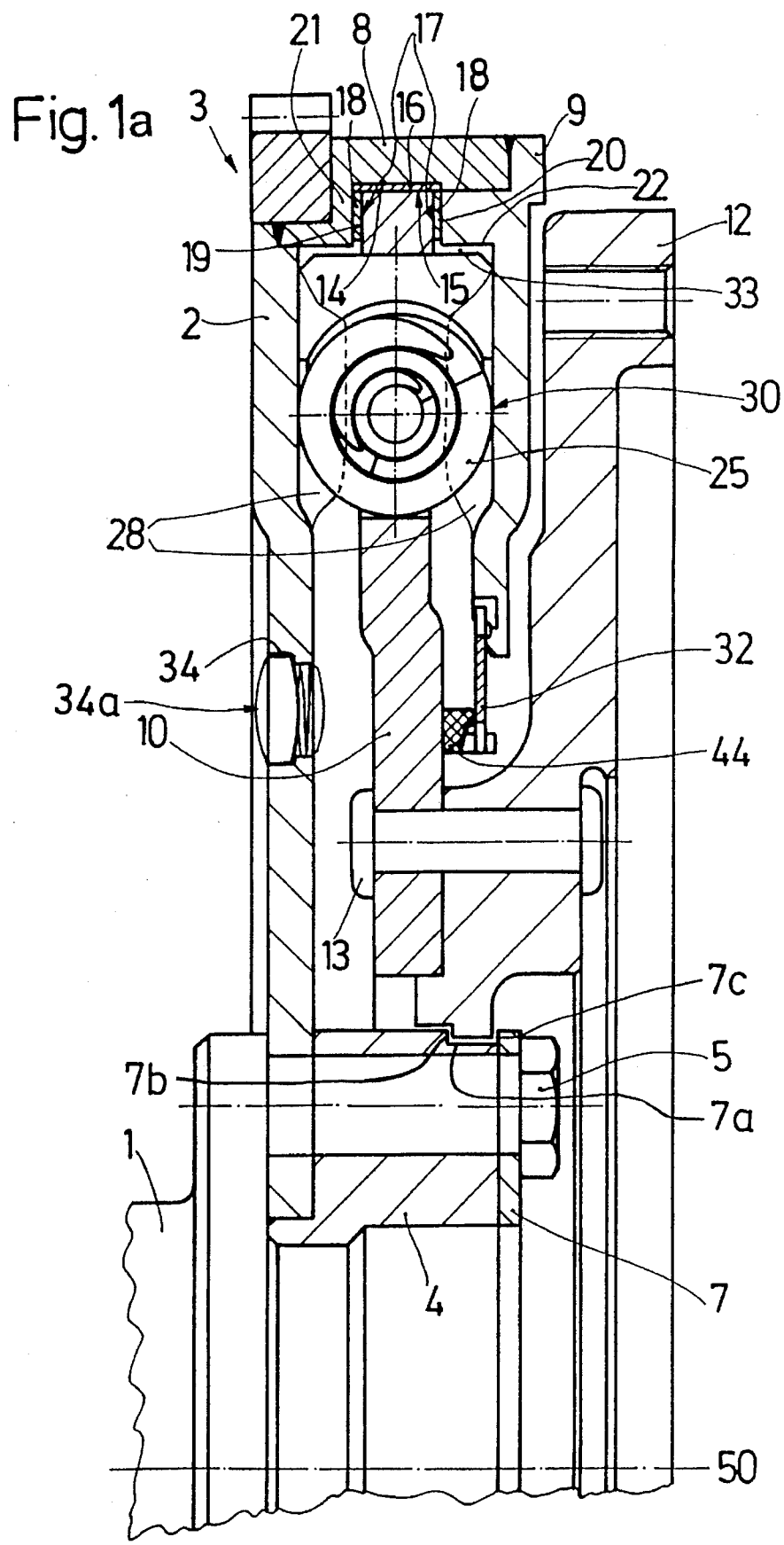
FIG. 1a shows an alternative view of a flywheel device similar to the flywheel device of FIG. 1.
Figure 2:
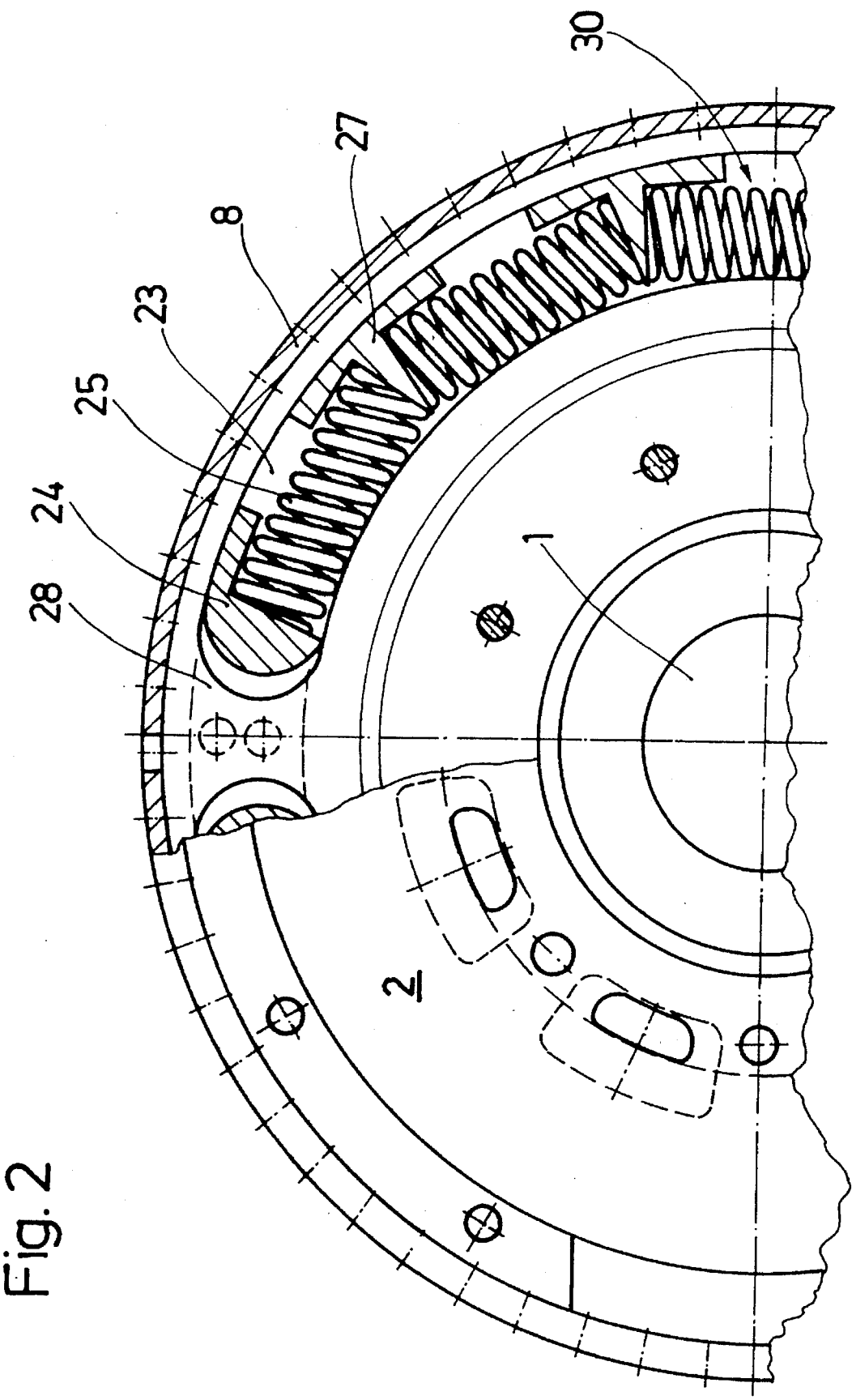
FIG. 2 shows the flywheel device in a front view, in partial cross section.

Within the hub 10, there can preferably be semi-circular recesses 23 as shown in FIG. 2. In these recesses 23, springs 25, spring plates 24 for engaging with the springs 25, and guide shoes 27 for engaging with the springs 25, can preferably be located. The spring plates 24 can preferably be placed in contact with stops 28 of the first flywheel 3. One possible embodiment of the stops 28 is further depicted in FIG. 1a. Changes in torque on the crankshaft 1, and thus on the first flywheel 3, can cause a deformation of the springs 25 with a displacement of the guide shoes 27 inside the respective recesses 23. When the springs 25 are deformed, the springs 25, as well as the displaceable grease surrounding them, are part of a torsion damping mechanism 30.

As shown in FIG. 1, at a radially inward end of the cover plate 9, facing the axis of rotation 50 of the flywheels 3, 12, a prestressed, curved washer 32 can preferably be non-rotationally connected. This curved washer 32 can preferably be non-rotationally connected, at its opposite side to a ring-shaped seal 44. Thus, as a result of the prestress, the curved washer 32 can bias the seal 44 into engagement against the hub 10. Consequently, on one hand as a result of the frictional connection between the seal 44 and the hub 10, the rotational movements of the hub 10 can be reduced when torque fluctuations occur, and thus a complete utilization of the spring travel of the springs 25 can be prevented, and on the other hand the space 33, filled with grease and surrounding the hub 10, can be sealed to prevent the escape of the grease. To fill this chamber 33, there can preferably be an opening 34 in the primary plate 2. This opening 34 can preferably be closed by means of a plug 34a as shown in FIG. 1a.

The plate 7 on the bearing flange 4, in conjunction with the bearing flange 4, can preferably be configured to form an emergency centering device for the second flywheel 12. For this purpose, in a circumferential portion of the bearing flange 4, as detailed in FIG. 1a, there can preferably be a radially inwardly stepped portion 7a which thereby forms a radially disposed wall 7b. The ends of the plate 7 can then preferably be configured to project radially beyond the outer circumference of the bearing flange 4 to form radial wall 7c. As such, the radially stepped portion 7a, in combination with the walls 7b and 7c can preferably form a guide channel. Then, in the event that the second flywheel 12 were to come loose from the bearing flange 4, e.g. in the event of a forcible rupture of the rivets 13, the second flywheel 12 could still be held axially from coming off the bearing flange 4 by means of the wall 7c. The same components can also serve to provide an emergency centering in the radial direction between the flange 4 and the flywheel 12.

The second flywheel 12, possibly in the manner as discussed further below with reference to the flywheel illustrated in FIG. 4, preferably supports both a clutch housing and a corresponding friction clutch with a clutch plate. Thus, an emergency centering of the clutch housing, and friction clutch, etc., can also be provided in the axial and radial directions by means of the channel formed by walls 7a, 7b and 7c.

For the configuration of the bearing claimed by the present invention, in addition to the embodiment as depicted in FIG. 1, other embodiments are also possible. Some of these other embodiments of a bearing which can support the hub 10 against axial forces which occur during the engagement or disengagement of the clutch and during operation, are illustrated in FIGS. 3a to 3e.

Figure 3A:
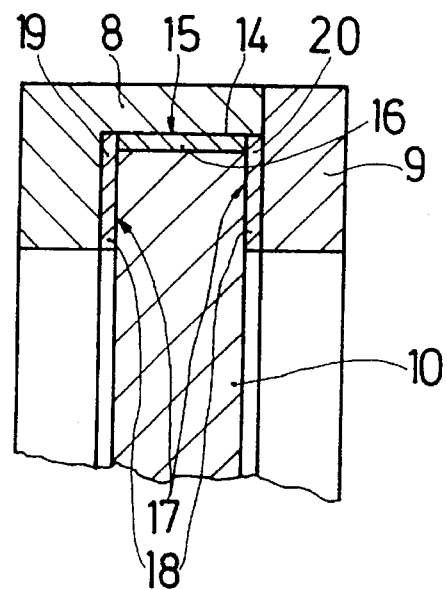
FIGS. 3a to 3e illustrate additional embodiments of axial and radial bearings.

In the embodiment as shown in FIG. 1, the radially outer edges of the discs 19 and 20, which discs act as displacement limit stops 18 for the hub 10, radially contact the ring 16 which forms the radial bearing 15. On the other hand, FIG. 3a shows an embodiment in which the discs 19, 20 project all of the way to the inner edge of the primary support 8, and are in contact axially with the radial bearing 15 on both sides of the ring 16.

Figure 3B:
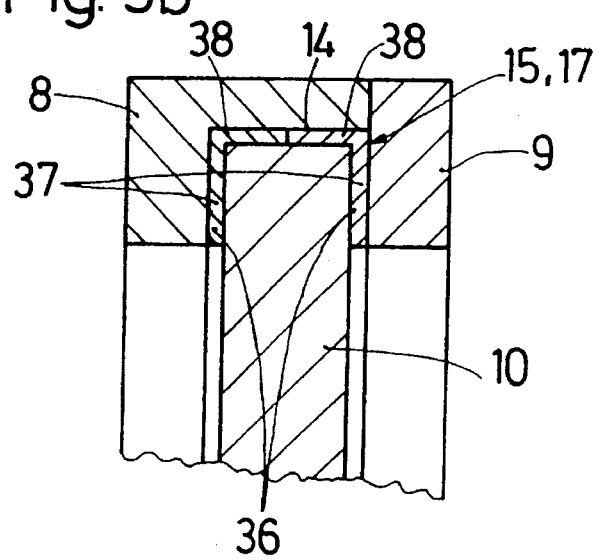

The embodiment illustrated in FIG. 3b has two ring-shaped shells 36 which preferably have an L-shaped cross section. On each of the two sections, there can preferably be a leg 37 parallel to the hub 10 which forms the axial contact surface for the corresponding side of the hub 10. In addition, a corresponding vertical leg 38 can be used for the radial guidance of the hub 10.

Figure 3C:
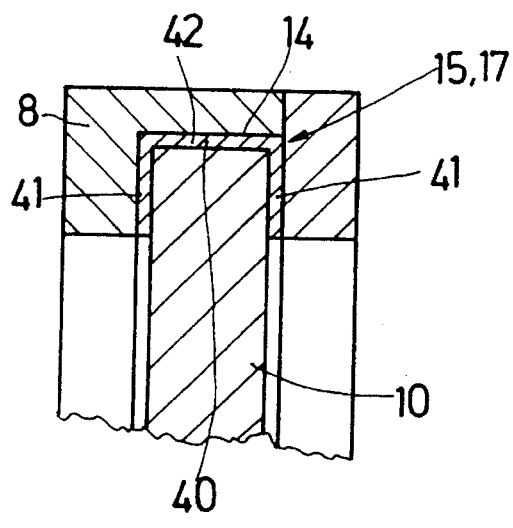

FIG. 3c shows a bearing shell 40 which preferably has a U-shaped cross section. In this embodiment, the legs 41, on both sides of the hub 10, provide for the axial guidance of the hub, and a central bearing portion 42 provides the radial guidance.

Figure 3D:
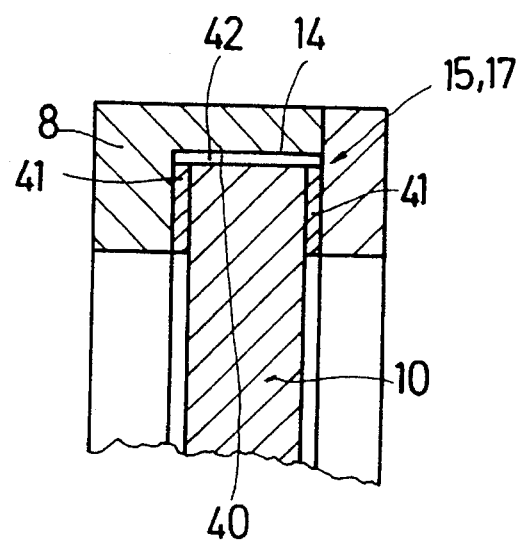
Figure 3E:
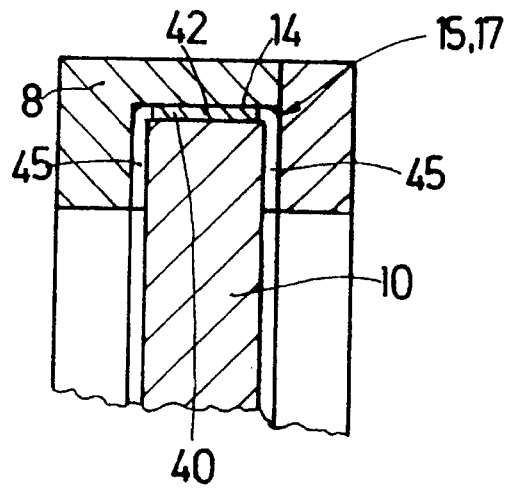

This central bearing portion can be interrupted, as illustrated in FIG. 3d, for a better fit on the inside of the primary support 8, by recesses which run parallel to the axis of rotation 50 (FIG. 1) of the flywheels 3, 12. FIG. 3e shows one embodiment of the bearing, in which, in contrast to the embodiment illustrated in FIG. 3c, the legs 41 parallel to the corresponding sides of the hub can have interruptions running in the radial direction which form tabs 45. This embodiment also fits the inside of the primary flywheel 3 particularly well. Likewise, as not shown, instead of a bearing which surrounds the hub 10 axially or radially, only segments of one of the bearing elements described above can be provided between the first flywheel 3 and the hub 10. These bearing segments can preferably optionally be fastened to the inside of the flywheel 3 or to the hub 10 in the circumferential portion of the hub 10.

Figure 4:
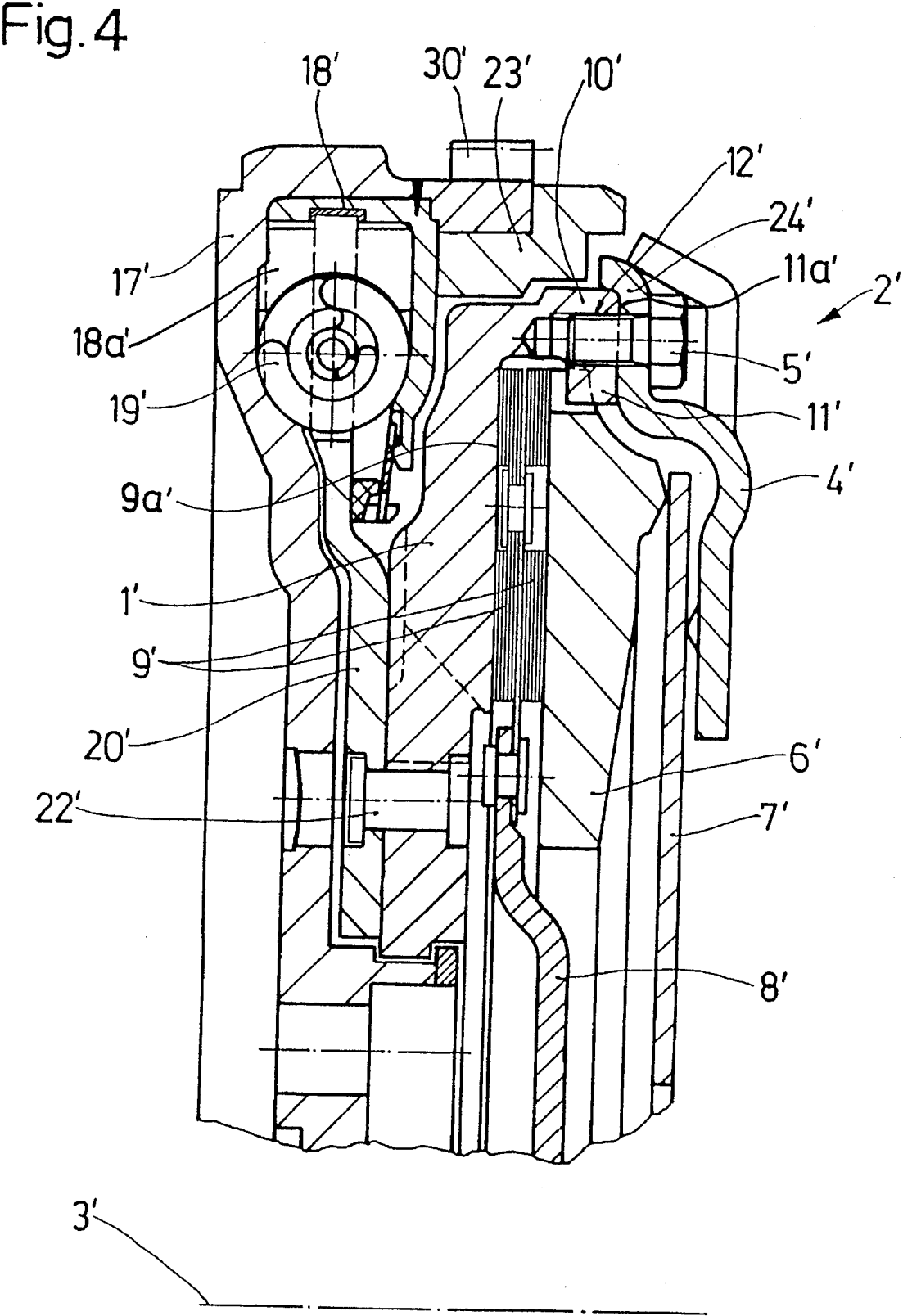
FIG. 4 shows an alternative view of a flywheel device in combination with a friction clutch.

A further depiction of a flywheel in combination with a friction clutch is shown in FIG. 4. In the embodiment of FIG. 4, a primary centrifugal mass 17' can preferably be bolted directly to a crankshaft of an internal combustion engine (not shown). The primary centrifugal mass 17' can preferably include a cover 18', rigidly connected to the primary centrifugal mass 17'. The primary centrifugal mass 17' and the cover 18' can thus form a torus-like chamber 18a', preferably concentric to an axis of rotation 3'. In this chamber 18a', several coil springs 19' can be disposed. A hub disc 20' can preferably extend into the torus-like chamber 18a', preferably in the radial direction, whereby the coil springs 19' can preferably be activated both by the hub disc 20', and by the primary centrifugal mass 17' and the cover 18'. The hub disc 20' can preferably be rigidly connected with a flywheel 1', preferably in the radially inner portion of the hub disc 20', by means of rivets 22'. Flywheel 1' can preferably be part of a secondary centrifugal mass. The flywheel 1' can be supported in relation to the primary centrifugal mass 17', preferably by means of a bearings as discussed above with reference to FIGS. 3a through 3e, but the flywheel 1' is preferably mounted so that it can rotate in relation to the primary centrifugal mass 17', preferably against the force of the coil springs 19'.

On the flywheel 1', preferably in the readially outer portion of the flywheel 1', there can preferably be an axially extending concentric wall 10'. The concentric wall 10' can surround the friction lining 9' of a clutch disc 8', preferably with a slight radial clearance. There can be a number of lugs 11' preferably disposed at an axial distance from a friction surface 9a' between the friction lining 9' and the flywheel 1'. The lugs 11' can preferably be distributed over the circumference of the concentric wall 10' and point radially inward. Threads 12' of the threaded fasteners 5' can preferably be located in the vicinity of the lugs 11'.

A pressure plate 2' of a friction clutch can preferably be releasably fastened to the flywheel 1' by means of the threaded fasteners 5'. A clutch housing 4' can thereby be equipped with a flange 24', which flange 24' can extend radially outward, and which flange 24' can be in contact with a corresponding radial surface 11a' of the flywheel 1'. The radial surface 11a' of the flywheel 1' can preferably be formed by the concentric wall 10' and by the lugs 11'. The pressure plate 2' preferably also has a thrust plate 6'. The thrust plate 6' can preferably be connected so that it is essentially torsionally stationary but can move axially, preferably with the clutch housing 4'. The thrust plate 6' can then be pressurized by a membrane spring 7', which membrane spring 7' can preferably be braced both on the thrust plate 6' and also on the clutch housing 4'. The thrust plate 6', by means of the membrane spring 7' can then preferably engage the friction linings 9' of the clutch disc 8' with the rotating flywheel 1', thereby also causing the clutch disc 8' to rotate. The clutch disc 8' can then, in turn cause a shaft of a transmission to rotate with the engine.

About an exterior periphery of the circumference of the flywheel 1', for example on an axial flywheel part 23'. there can preferably be a toothed portion 30' which can be engaged by a starter (not shown) of a motor vehicle to provide motion to the engine parts, for example, while combustion is being initiated.

Figure 5:
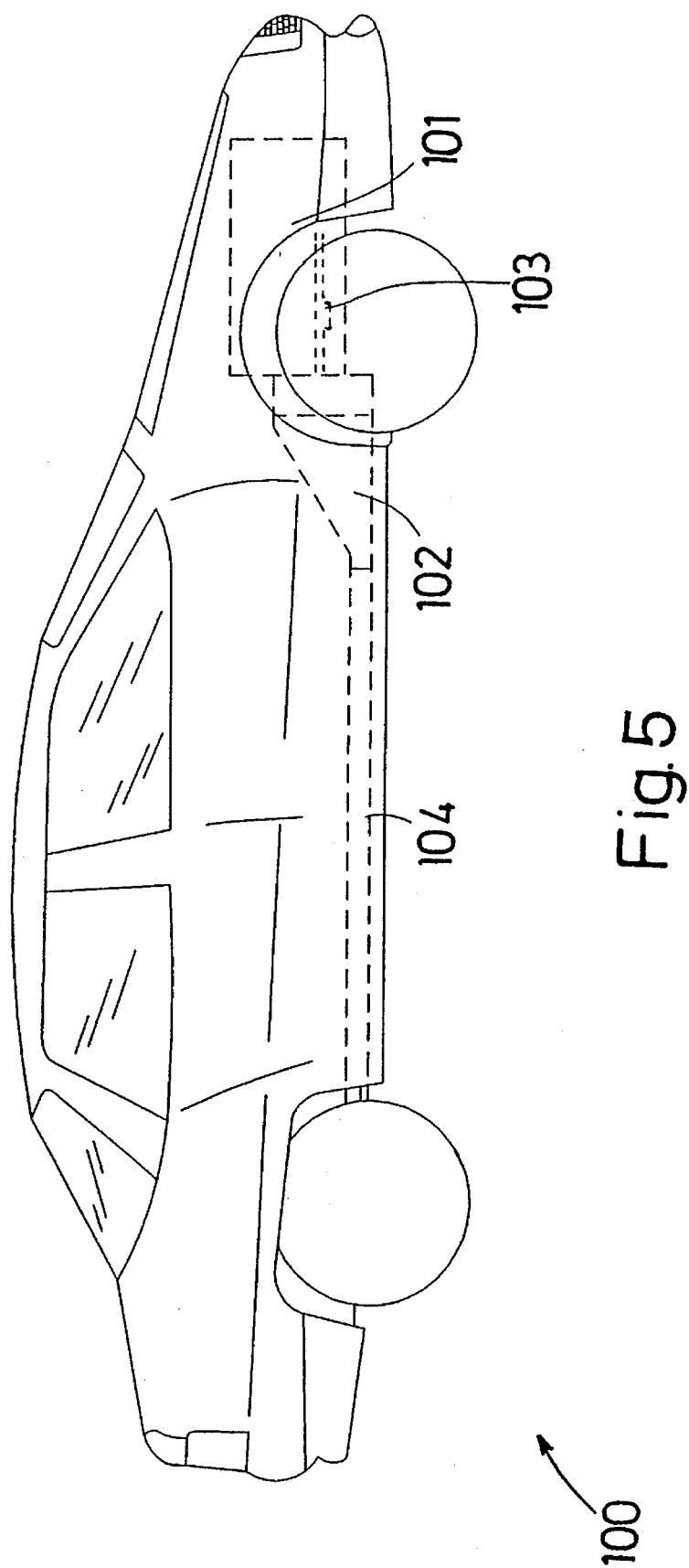
FIG. 5 depicts the general components of a motor vehicle power train.

FIG. 5 shows what could be considered to be a typical automobile 100, which automobile 100 can include an internal combustion engine 101, which can be mounted in a forward portion of the automobile. The combustion engine 101 can have a crankshaft 103 for outputting mechanical rotary power generated by the engine 101. The automobile 100 could also typically include a transmission 102 for transmitting mechanical power from the crankshaft 103 of the engine 101 to the wheels, via drive shaft 104. If the automobile has a manual transmission 102, the flywheels 3, 12, pressure plate 2', and clutch disc 8' of the present invention may also be included for engaging the transmission 102 with the engine 101.

One feature of the invention resides broadly in the flywheel in halves with a first flywheel which is connected to the crankshaft of an internal combustion engine, is provided with a thrust bearing for a hub and is designed in the circumferential area with a radial bearing for the hub, and a second flywheel which can rotate in synchronization with the first flywheel and can execute a limited relative rotation with respect to the first flywheel, characterized by the fact that the thrust bearing 17 is provided with displacement limit stops 18 for the hub 10 which extend on both sides of the hub 10 to the radial bearing 15.

Another feature of the invention resides broadly in the flywheel in halves, with a primary plate on the one side of the hub, a cover plate on the other side of the hub and a primary support which connects the primary plate to the cover plate and surrounds the two plates in a ring-shaped fashion, characterized by the fact that the primary support 8, on its inside facing the hub 10, holds both the radial bearing 15 and the thrust bearing 17.

Still another feature of the invention resides broadly in the flywheel in halves, characterized by the fact that the displacement limit stops 18 of the thrust bearing 17 are engaged on the hub 10 in the radially outside peripheral area of the hub 10.

Yet another feature of the invention resides broadly in the flywheel in halves, with a grease well which surrounds the hub and is bounded by the primary support and the cover plate, characterized by the fact that the thrust bearing 17 and the radial bearing 15 are located at least partly in the grease well 33.

Still yet another feature of the invention resides broadly in the flywheel in halves, characterized by the fact that the displacement limit stops 18 of the thrust bearing 17 are each formed by a disc 19, 20 which can be centered on the radial bearing 15.

Yet still another feature of the invention resides broadly in the flywheel in halves, characterized by the fact that the displacement limit stops 18 are each formed by a disc 19, 20, each of which can be centered on the inner edge of an encircling depression 14 formed in the circumferential portion of the first flywheel 3.

Another feature of the invention resides broadly in the flywheel in halves, characterized by the fact that the thrust bearing 17 has a two-legged shell 36 on each side of the hub, one leg 37 of which acts as a displacement limit stop 18 and runs parallel to the side of the hub, and the other leg 38 of which encloses the hub 10.

Still another feature of the invention resides broadly in the flywheel in halves, characterized by the fact that the thrust bearing 17 has a bearing part 42 which holds the hub 10 radially, on which, on both sides of the hub 10, a leg 41 is molded to act as a displacement limit stop 18 for the hub 10.

Yet another feature of the invention resides broadly in the flywheel in halves, characterized by the fact that the bearing part 42 is interrupted by recesses running in the axial direction.

Still yet another feature of the invention resides broadly in the flywheel in halves, characterized by the fact that the legs 37, 41 are each interrupted by recesses oriented radially with respect to the axis of the hub.

Yet still another feature of the invention resides broadly in the flywheel in halves, characterized by the fact that the thrust bearing 17 is provided on both sides of the hub with segments which form the contact surface for the hub 10.

Still another feature of the invention resides broadly in the flywheel in halves, characterized by the fact that the hub 10, in the range of the thrust bearing 17 has segments which form a contact surface.

Some examples of transmissions in which the present invention may be incorporated may be disclosed by the following U.S. Pat. Nos.: 5,199,316 to Hoffman, entitled "Fully-Synchronized Multiple Speed Manual Transmission for Motor Vehicles"; 4,458,551 to Winter, entitled "Manual Transmission"; and 3,858,460 to Porter et al., entitled "Four Speed Manual Transmission and Control".

Some examples of clutch assemblies which could possibly be used in conjunction with the present invention may be disclosed in the following U.S. Pat. Nos.: 4,684,007 to Maucher, entitled "Clutch Plate"; 4,635,780 to Wiggen, entitled "Clutch Disc for a Motor Vehicle Friction Clutch"; and 4,651,857 to Schraut et al., entitled "Clutch Disc Unit for a Motor Vehicle Clutch".

Some examples of two-mass flywheels and the components thereof which may incorporate the present invention therein may be disclosed by the following U.S. Pat. Nos.: 5,103,688 to Kuhne, entitled "Two-Mass Flywheel"; 4,777,843 to Bopp, entitled "Two-Mass Flywheel Assembly With Viscous Damping Assembly".

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if any, described herein.

All of the patents, patent applications and publications recited herein, and in the Declaration attached hereto, are hereby incorporated by reference as if set forth in their entirety herein.

The corresponding foreign patent publication applications, namely, Federal Republic of Germany Patent Application No. P 43 35 207.3, having inventors Bernhard Schierling, Ralf Till and Jörg Sudau, and DE-OS P 43 35 207.3 and DE-PS P 43 35 207.3, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The invention as described hereinabove in the context of the preferred embodiments is not to be taken as limited to all of the provided details thereof, since modifications and variations thereof may be made without departing from the spirit and scope of the invention.

What is claimed is:

1. A flywheel for an internal combustion engine of a motor vehicle for transmitting mechanical rotary power from an internal combustion engine to a transmission, said flywheel comprising:

a first flywheel portion and a second flywheel portion, said second flywheel portion being disposed adjacent said first flywheel portion;

said first flywheel portion comprising means for non-rotationally connecting said first flywheel portion to a crankshaft of an internal combustion engine;

said first flywheel portion being rotatable about an axis of rotation, said axis of rotation having a first axial direction parallel to said axis of rotation, and a second axial direction opposite to the first axial direction;

said second flywheel portion being rotatable about said axis of rotation;

means for connecting together said first flywheel portion and said second flywheel portion for rotating said second flywheel portion with said first flywheel portion;

said second flywheel portion comprising a peripheral portion disposed radially away from the axis of rotation;

bearing means;

said bearing means being a separate part from said first flywheel portion and said second flywheel portion;

said bearing means comprising a thrust bearing for limiting axial movement of said second flywheel portion with respect to said first flywheel portion in both said first and second axial directions;

said thrust bearing being disposed adjacent said first flywheel portion;

said thrust bearing being disposed between said first flywheel portion and said second flywheel portion;

said thrust bearing being disposed adjacent said peripheral edge of said second flywheel portion.

2. The flywheel according to claim 1, wherein:

said first flywheel portion comprises:

a peripheral area disposed radially away from said axis of rotation;

said peripheral area comprises an annular groove;
said annular groove comprises two side portions;
said two side portions being disposed substantially opposite to one another;
said two side portions being substantially transverse to said axis of rotation;
said thrust bearing comprises two portions; and
said two portions of said thrust bearing being disposed adjacent said two side portions of said annular groove.

3. The flywheel according to claim 2, wherein:
said two portions of said thrust bearing comprise a first bearing portion and a second bearing portion;
said first bearing portion comprises a first disc-shaped bearing member, and said second bearing portion comprises a second disc-shaped bearing member.

4. The flywheel according to claim 3, wherein:
said annular groove further comprises a base portion disposed substantially between said two side portions;
said two side portions extending from said base portion; and
said base portion being disposed farther away from said axis of rotation than said two side portions.

5. The flywheel according to claim 4, wherein:
said bearing means further comprises:
a radial bearing for limiting radial movement of said second flywheel portion with respect to said first flywheel portion;
said radial bearing being disposed adjacent said first flywheel portion;
said radial bearing being disposed between said first flywheel portion and said second flywheel portion;
said radial bearing being disposed adjacent the peripheral edge of said second flywheel portion;
said radial bearing being disposed adjacent said base portion of said annular groove.

6. The flywheel according to claim 5, wherein said radial bearing comprises a ring-shaped bearing member.

7. The flywheel according to claim 6, wherein:
said first flywheel portion comprises:
a first plate for being connected to the crankshaft of an internal combustion engine;
a second plate disposed substantially parallel to said first plate, and spaced apart axially from said first plate to define a disc-shaped chamber between said first plate and said second plate;
means for non-rotationally connecting said first plate to said second plate, said means for non-rotationally connecting comprising said thrust bearing;
said second flywheel portion comprises:
a third plate disposed in said disc-shaped chamber between said first plate and said second plate of said first flywheel portion, said third plate comprising a peripheral edge defining said peripheral portion of said second flywheel portion;
a fourth plate disposed substantially parallel to said third plate and spaced apart from said third plate, said second plate extending between said third plate and said fourth plate; and
means for non-rotationally connecting said third plate to said fourth plate.

8. The flywheel according to claim 7, wherein:
said means for non-rotationally connecting said first plate to said second plate comprises a ring-shaped connecting member extending axially from said first plate to said second plate;
said ring-shaped connecting member having an inner surface disposed to face said axis of rotation, said inner surface defining a radial surface of said disc-shaped chamber;
said thrust bearing and said radial bearing are disposed at least partly in said disc-shaped chamber;
said flywheel further comprises a medium having lubricating and damping properties;
said disc-shaped chamber between said first plate and said second plate being configured for containing therein said medium having lubricating and damping properties; and
said flywheel further comprises means for sealing the lubricating and damping medium into the chamber.

9. The flywheel according to claim 8, wherein:
said third plate comprises a first axial side and a second axial side opposite said first side;
said first thrust bearing portion engages said first side of said third plate and said second thrust bearing portion engages said second side of said plate;
said ring-shaped connecting member comprising said annular groove disposed on said inner surface;
at least one of:
said first thrust bearing portion,
said second thrust bearing portion, and
said radial bearing comprising a plurality of spaced apart bearing pieces, individually disposed with respect to others of said bearing pieces;
said plurality of bearing pieces being disposed on at least one of:
circumferentially about said first side of said third plate for providing at least part of said first thrust bearing portion;
circumferentially about said second side of said third plate for providing at least part of said second thrust bearing portion;
circumferentially about said peripheral edge of said third plate to provide at least part of said radial bearing;
about said first side portion of said annular groove for providing at least part of said first thrust bearing portion;
about said second side portion of said annular groove for providing at least part of said second thrust bearing portion; and
about said base portion of said annular groove to provide at least part of said radial bearing.

10. The flywheel according to claim 8, wherein:
said third plate comprises a first axial side and a second axial side opposite said first side;
said first thrust bearing portion engages said first side of said third plate and said second thrust bearing portion engages said second side of said third plate; and
said ring-shaped connecting member comprising said annular groove disposed on said inner surface.

11. The flywheel according to claim 10, wherein:
said first disc-shaped bearing member, said ring-shaped bearing member and said second disc-shaped bearing member define a U-shaped cross-section in said annular groove;
said first disc-shaped bearing member, said ring-shaped bearing member and said second disc-shaped bearing member comprise one of:
a) three separate bearing components for being disposed in said annular groove, a first component comprising said first disc-shaped bearing member, a second component comprising said second disc-shaped bearing member and a third component comprising said ring-shaped bearing member;
b) first and second separate L-shaped bearing components with each of said first and second L-shaped bearing components comprising:
   at least a portion of said ring-shaped bearing member; and
   one of said first and second disc-shaped bearing members; and
c) a single U-shaped bearing component having a base portion comprising said ring-shaped bearing member and first and second leg portions extending from said base portion with each of said first and second leg portions comprising one of said first and second disc-shaped bearing members;

said first and second disc-shaped bearing members have a radially inner edge disposed towards said axis of rotation;

at least one of said first disc-shaped bearing member, said second disc-shaped bearing member and said ring-shaped bearing member comprise openings therethrough, with openings in said ring-shaped member being disposed axially between said first first and second disc-shaped bearing members, and openings in said first and second disc-shaped bearing members being disposed radially from said ring-shaped bearing member to said inner edge thereof;

said first plate comprises a first disc-shaped plate having a central opening therein, said first disc-shaped plate having a radially inner edge and a radially outer edge, and said radially inner edge comprising said means for connecting said first flywheel portion to a crankshaft, said means for connecting comprising passage means, said passage means for passage of bolts therethrough;

said first flywheel portion further comprises a hub disposed adjacent said radially inner edge of said first disc-shaped plate, said hub extending axially away from said radially inner edge in a direction towards said fourth plate;

said third and fourth plates being limitably rotatable about said hub;

said second plate comprises a second disc-shaped plate having a central opening therein, said second disc-shaped plate comprising a radially inner edge and a radially outer edge;

said ring-shaped connecting member comprises a substantially S-shaped cross-section having a first side connected to said radially outer edge of said first disc-shaped plate and a second side connected to said radially outer edge of said second disc-shaped plate;

said means for sealing said chamber comprises a ring-shaped washer disposed adjacent said radially inner edge of said second disc-shaped plate, said radially inner edge of said second disc-shaped plate comprising groove means for receiving said radially outer edge of said washer therein, said groove means being configured for tensioning said radially inner edge of said washer towards said second plate;

said washer for sealing said chamber further comprises a gasket connected to said radially inner edge of said washer and between said radially inner edge of said washer and said second plate;

said third plate comprises a third disc-shaped plate having a central opening therein, said third disc-shaped plate having a radially inner edge disposed towards said hub and a radially outer edge disposed in said annular groove;

said third disc-shaped plate further comprises semi-circular openings therein disposed circumferentially about said third disc-shaped plate adjacent said radially outer edge;

said means for connecting together said first flywheel portion and said second flywheel portion comprises a plurality of springs disposed in said semi-circular openings;

said third disc-shaped plate comprising contact surfaces adjacent said semi-circular openings for contacting ends of said springs;

at least one of said first disc-shaped plate and said second disc-shaped plate also comprising contact surfaces for contacting ends of said springs;

said springs comprising torsional damping means for damping torsional changes between said first and second flywheel portions;

said fourth plate comprises a fourth disc-shaped plate having a central opening therein, said fourth disc-shaped plate having a radially inner edge disposed towards said hub and a radially outer edge disposed away from said hub;

said means for non-rotationally connecting said third plate to said fourth plate comprises rivet means, said rivet means for connecting said radially inner edge of said third disc-shaped plate to said radially inner edge of said fourth disc-shaped plate;

said radially outer edge of said fourth disc-shaped plate comprising means for connecting said fourth disc-shaped plate to a housing of a friction clutch;

said fourth disc-shaped plate comprises an axial surface for engaging with friction linings of the friction clutch;

said hub of said flywheel device comprises an end disposed radially within said inner radial edge of said fourth disc-shaped plate;

said hub comprises an exterior surface disposed towards said fourth disc-shaped plate;

said end of said hub comprises an annular notch in said exterior surface, said annular notch having an external radius;

said hub further comprises a ring-shaped member disposed adjacent said end thereof, said ring-shaped member having an external radius greater than the external radius of said notch of said hub to define an axial edge of said notch;

said radially inner edge of said fourth disc-shaped member comprising an annular projection for engaging in said notch of said hub;

said first disc-shaped plate comprises a closable opening therein for adding lubricating medium to said chamber;

said flywheel comprises plug means for closing said opening for adding lubricating medium to said chamber;

said ring-shaped connecting member is welded to said first and second disc-shaped plates; and one of: said first disc-shaped plate, said second disc-shaped plate and said ring-shaped connecting member comprises circumferential toothing disposed thereabout for engaging with a starter of an internal combustion engine.

12. A flywheel for an engine, said flywheel comprising:

a first flywheel portion for being non-rotationally connected to an output shaft of an engine;

a second flywheel portion disposed adjacent said first flywheel portion;

means for connecting together said first flywheel portion and said second flywheel portion for rotating said second flywheel portion with said first flywheel portion;

said first and second flywheel portions being rotatable about an axis of rotation, the axis of rotation having a first axial direction parallel to the axis of rotation, and a second axial direction opposite to the first axial direction;

said second flywheel portion comprising a peripheral portion disposed radially away from said axis of rotation, said peripheral portion defining a radius of said second flywheel portion;

said first flywheel portion having an outer circumferential surface;

said first flywheel portion having a periphery;

said periphery having an outer periphery and an inner periphery;

said outer periphery being disposed adjacent to the outer circumferential surface of said first flywheel portion;

said flywheel further comprises a thrust bearing for limiting axial movement of said second flywheel portion with respect to said first flywheel portion in both said first and second axial directions;

said thrust bearing being disposed a distance from said axis of rotation at said outer periphery of said first flywheel portion;

said thrust bearing being disposed between said first flywheel portion and said second flywheel portion; and said distance of said thrust bearing from said axis of rotation being greater than a substantial portion of said radius of said second flywheel portion.

13. The flywheel according to claim 12, wherein:

said first flywheel portion comprises:
  a first plate for being connected to an output shaft of an engine;
  a second plate disposed substantially parallel to said first plate, and spaced apart axially from said first plate to define a disc-shaped chamber between said first plate and said second plate; and
  means for non-rotationally connecting said first plate to said second plate, said means for non-rotationally connecting comprises a portion for encircling;
  said portion for encircling being disposed radially away from the axis of rotation and encircling the peripheral edge of said second flywheel portion;

said second flywheel portion comprises:
  a third plate disposed in said disc-shaped chamber between said first plate and said second plate of said first flywheel portion;
  a fourth plate disposed substantially parallel to said third plate and spaced apart from said third plate, said second plate extending between said third plate and said fourth plate; and
  means for non-rotationally connecting said third plate to said fourth plate;

said means for non-rotationally connecting said first plate to said second plate comprises a radial bearing and said thrust bearing; and said third plate comprises a first axial side portion, a second axial side portion opposite said first axial side portion and a peripheral edge;

said peripheral edge and said first and second side portions being engaged by said radial bearing and said thrust bearing.

14. The flywheel according to claim 13, wherein:

said means for non-rotationally connecting said first plate to said second plate comprises a ring-shaped connecting member extending axially from said first plate to said second plate;

said ring-shaped connecting member having an inner surface disposed to face said axis of rotation, said inner surface defining a radial surface of said disc-shaped chamber;

said inner surface of said ring-shaped connecting member being disposed adjacent said radial bearing, said radial bearing for engaging said peripheral edge of said third plate for limiting radial movement of said second flywheel portion;

said thrust bearing and said radial bearing are disposed at least partly in said disc-shaped chamber;

said flywheel further comprises a medium having lubricating and damping properties;

said disc-shaped chamber between said first plate and said second plate being configured for containing therein said medium having lubricating and damping properties; and said flywheel further comprises means for sealing the lubricating and damping medium into the chamber.

15. The flywheel according to claim 14, wherein:

said thrust bearing is disposed adjacent said peripheral edge of said third plate;

said third plate comprising a first axial side and a second axial side opposite said first side;

said thrust bearing comprises a first bearing portion for engaging said first side of said third plate and a second bearing portion for engaging said second side of said plate.

16. The flywheel according to claim 15, wherein:

said ring-shaped connecting member comprising an annular groove disposed on said inner surface, said annular groove comprising a base surface and two side surfaces disposed spaced apart and extending from said base surface;

said first thrust bearing portion comprises a first disc-shaped bearing member disposed adjacent one of said two side surfaces of said annular groove, and said second thrust bearing portion comprises a second disc-shaped bearing member disposed adjacent the other of said two side surfaces of said annular groove;

said radial bearing comprises a ring-shaped bearing member disposed adjacent said base surface of said annular groove;

each of said first and second disc-shaped bearing members comprising a corresponding radially external edge;

each said radially external edge of each of said first and second disc-shaped bearing members adjoining, and being centered in said flywheel by one of:
  said ring-shaped bearing member; and
  said base surface of said annular groove;

said first disc-shaped bearing member, said ring-shaped bearing member and said second disc-shaped bearing member define a U-shaped cross-section in said annular groove;

said first disc-shaped bearing member, said ring-shaped bearing member and said second disc-shaped bearing member comprise one of:

a) three separate bearing components for being disposed in said annular groove;
b) first and second separate L-shaped bearing components with each of said first and second L-shaped bearing components comprising:
   at least a portion of said ring-shaped bearing member; and
   one of said first and second disc-shaped bearing members; and
c) a single U-shaped bearing component having a base portion comprising said ring-shaped bearing member and first and second leg portions extending from said base portion with each of said first and second leg portions comprising one of said first and second disc-shaped bearing members;

said first and second disc-shaped bearing members have a radially inner edge disposed towards said axis of rotation;

at least one of said first disc-shaped bearing member, said second disc-shaped bearing member and said ring-shaped bearing member comprise openings therethrough, with openings in said ring-shaped member being disposed axially between said first first and second disc-shaped bearing members, and openings in said first and second disc-shaped bearing members being disposed radially from said ring-shaped bearing member to said inner edge thereof;

said first plate comprises a first disc-shaped plate having a central opening therein, said first disc-shaped plate having a radially inner edge and a radially outer edge, and said radially inner edge comprising means for connecting said first flywheel portion to an output shaft of an engine, said means for connecting comprising passage means, said passage means for passage of bolts therethrough;

said first flywheel portion further comprises a hub disposed adjacent said radially inner edge of said first disc-shaped plate, said hub extending axially away from said radially inner edge in a direction towards said fourth plate;

said third and fourth plates being limitably rotatable about said hub;

said second plate comprises a second disc-shaped plate having a central opening therein, said second disc-shaped plate comprising a radially inner edge and a radially outer edge;

said ring-shaped connecting member comprises a substantially S-shaped cross-section having a first side connected to said radially outer edge of said first disc-shaped plate and a second side connected to said radially outer edge of said second disc-shaped plate;

said means for sealing said chamber comprises a ring-shaped washer disposed adjacent said radially inner edge of said second disc-shaped plate, said radially inner edge of said second disc-shaped plate comprising groove means for receiving said radially outer edge of said washer therein, said groove means being configured for tensioning said radially inner edge of said washer towards said second plate;

said means for sealing said chamber further comprises a gasket connected to said radially inner edge of said washer and between said radially inner edge of said washer and said second plate;

said third plate comprises a third disc-shaped plate having a central opening therein, said third disc-shaped plate having a radially inner edge disposed towards said hub and a radially outer edge disposed in said annular groove;

said third disc-shaped plate further comprises semi-circular openings therein disposed circumferentially about said third disc-shaped plate adjacent said radially outer edge;

said means for connecting together said first flywheel portion and said second flywheel portion comprises a plurality of springs disposed in said semi-circular openings;

said third disc-shaped plate comprising contact surfaces adjacent said semi-circular openings for contacting ends of said springs;

at least one of said first disc-shaped plate and said second disc-shaped plate also comprising contact surfaces for contacting ends of said springs;

said springs comprising torsional damping means for damping torsional changes between said first and second flywheel portions;

said fourth plate comprises a fourth disc-shaped plate having a central opening therein, said fourth disc-shaped plate having a radially inner edge disposed towards said hub and a radially outer edge disposed away from said hub;

said means for non-rotationally connecting said third plate to said fourth plate comprises rivet means, said rivet means for connecting said radially inner edge of said third disc-shaped plate to said radially inner edge of said fourth disc-shaped plate;

said flywheel comprises a flywheel for outputting mechanical rotary power to a friction clutch, the friction clutch comprising:
a housing;
clutch hub means disposed within said housing
a friction disc disposed about said clutch hub means within said housing;
said friction disc comprising friction linings for frictionally engaging said fourth disc-shaped plate to receive mechanical rotary power from said flywheel device;
pressure plate means for pressing said friction linings into engagement with said fourth disc-shaped plate;
biasing means for applying pressure to said pressure plate means to press said friction linings into engagement with said fourth disc-shaped plate;
means for connecting said housing to said fourth disc-shaped plate;

said radially outer edge of said fourth disc-shaped plate comprising means for being connected to said housing of said friction clutch;

said fourth disc-shaped plate comprises an axial surface for engaging with said friction linings of said friction clutch;

said hub of said flywheel device comprises an end disposed radially within said inner radial edge of said fourth disc-shaped plate;

said hub comprises an exterior surface disposed towards said fourth disc-shaped plate;

said end of said hub comprises an annular notch in said exterior surface, said annular notch having an external radius;

said hub further comprises a ring-shaped member disposed adjacent said end thereof, said ring-shaped member having an external radius greater than the external radius of said notch of said hub means to define an axial edge of said notch;

said radially inner edge of said fourth disc-shaped member comprising an annular projection for engaging in said notch of said hub;

said first disc-shaped plate comprises a closable opening therein for adding lubricating medium to said chamber;

said flywheel comprises plug means for closing said opening for adding lubricating medium to said chamber;

said ring-shaped connecting member is welded to said first and second disc-shaped plates; and one of: said first disc-shaped plate, said second disc-shaped plate and said ring-shaped connecting member comprises circumferential toothing disposed thereabout for engaging with a starter of an internal combustion engine.

17. A flywheel device for transmitting mechanical rotary power from an internal combustion engine to a transmission, said flywheel device comprising:

first flywheel means and second flywheel means, said second flywheel means being disposed adjacent said first flywheel means;

said first flywheel means comprising means for non-rotationally connecting said first flywheel means to a crankshaft of an internal combustion engine;

said first flywheel means being rotatable about an axis of rotation, said axis of rotation having a first axial direction parallel to said axis of rotation, and a second axial direction opposite to the first axial direction;

said second flywheel means being rotatable about said axis of rotation;

means for connecting together said first flywheel means and said second flywheel means for rotating said second flywheel means with said first flywheel means;

said second flywheel means comprising a first axial side, a second axial side and a peripheral edge disposed radially away from the axis of rotation;

said first flywheel means having a portion disposed radially away from the axis of rotation and encircling the peripheral edge of said second flywheel means;

said flywheel device further comprising:
 a bearing disposed between said first flywheel means and said second flywheel means;
 said bearing comprising;
  a radial bearing for engaging said peripheral edge of said second flywheel means for limiting radial movement of said second flywheel means with respect to said first flywheel means; and
  a thrust bearing for engaging said first and second side portions of said second flywheel means for limiting axial movement of said second flywheel means with respect to said first flywheel means in said first and second axial directions;

said thrust bearing having a first bearing portion for engaging said first side of said second flywheel means, and a second bearing portion for engaging said second side of said second flywheel means; and said first and second bearing portions of said thrust bearing extending from said radial bearing radially inwardly toward said axis of rotation.

18. The flywheel device according to claim 17, wherein:

said first flywheel means comprises:
 a first plate for being connected to a crankshaft of an engine;
 a second plate disposed substantially parallel to said first plate, and spaced apart axially from said first plate to define a disc-shaped chamber between said first plate and said second plate; and
 means for non-rotationally connecting said first plate to said second plate, said means for non-rotationally connecting comprises said portion for encircling;

said second flywheel means comprises:
 a third plate disposed in said disc-shaped chamber between said first plate and said second plate of said first flywheel means;
 a fourth plate disposed substantially parallel to said third plate and spaced apart from said third plate, said second plate extending between said third plate and said fourth plate; and
 means for non-rotationally connecting said third plate to said fourth plate;

said means for non-rotationally connecting said first plate to said second plate comprises said radial bearing and said thrust bearing; and said third plate comprises said peripheral edge and said first and second side portions engaged by said radial bearing and said thrust bearing.

19. The flywheel device according to claim 18, wherein:

said means for non-rotationally connecting said first plate to said second plate comprises a ring-shaped connecting member extending axially from said first plate to said second plate;

said ring-shaped connecting member having an inner surface disposed towards said axis of rotation, said inner surface defining a radial surface of said disc-shaped chamber;

said thrust bearing and said radial bearing are disposed at least partly in said disc-shaped chamber;

said disc-shaped chamber between said first plate and said second plate being configured for containing therein a medium having lubricating and damping properties; and said flywheel device further comprises means for sealing the lubricating and damping medium into the chamber.

20. The flywheel device according to claim 19, wherein:

said ring-shaped connecting member comprises an annular groove disposed on said inner surface, said annular groove comprising a base surface and two side surfaces disposed spaced apart and extending from said base surface;

said first thrust bearing portion comprises a first disc-shaped bearing member disposed adjacent one of said two side surfaces of said annular groove, and said second thrust bearing portion comprises a second disc-shaped bearing member disposed adjacent the other of said two side surfaces of said annular groove;

said radial bearing comprises a ring-shaped bearing member disposed adjacent said base surface of said annular groove;

each of said first and second disc-shaped bearing members comprising a corresponding radially external edge;

each said radially external edge of each of said first and second disc-shaped bearing members adjoining, and being centered in said flywheel device by one of:
 said ring-shaped bearing member; and
 said base surface of said annular groove;

said first disc-shaped bearing member, said ring-shaped bearing member and said second disc-shaped bearing member define a U-shaped cross-section in said annular groove;

said first disc-shaped bearing member, said ring-shaped bearing member and said second disc-shaped bearing member comprise one of:
  a) three separate bearing components for being disposed in said annular groove;
  b) first and second separate L-shaped bearing components with each of said first and second L-shaped bearing components comprising:
    at least a portion of said ring-shaped bearing member; and
    one of said first and second disc-shaped bearing members; and
  c) a single U-shaped bearing component having a base portion comprising said ring-shaped bearing member and first and second leg portions extending from said base portion with each of said first and second leg portions comprising one of said first and second disc-shaped bearing members;

said first and second disc-shaped bearing members have a radially inner edge disposed towards said axis of rotation;

at least one of said first disc-shaped bearing member, said second disc-shaped bearing member and said ring-shaped bearing member comprise openings therethrough, with openings in said ring-shaped member being disposed axially between said first first and second disc-shaped bearing members, and openings in said first and second disc-shaped bearing members being disposed radially from said ring-shaped bearing member to said inner edge thereof;

said first plate comprises a first disc-shaped plate having a central opening therein, said first disc-shaped plate having a radially inner edge and a radially outer edge, and said radially inner edge comprising said means for connecting said first flywheel means to a crankshaft, said means for connecting comprising passage means, said passage means for passage of bolts therethrough;

said first flywheel means further comprises a hub disposed adjacent said radially inner edge of said first disc-shaped plate, said hub extending axially away from said radially inner edge in a direction towards said fourth plate;

said third and fourth plates being limitably rotatable about said hub;

said second plate comprises a second disc-shaped plate having a central opening therein, said second disc-shaped plate comprising a radially inner edge and a radially outer edge;

said ring-shaped connecting member comprises a substantially S-shaped cross-section having a first side connected to said radially outer edge of said first disc-shaped plate and a second side connected to said radially outer edge of said second disc-shaped plate;

said means for sealing said chamber comprises a ring-shaped washer disposed adjacent said radially inner edge of said second disc-shaped plate, said radially inner edge of said second disc-shaped plate comprising groove means for receiving said radially outer edge of said washer therein, said groove means being configured for tensioning said radially inner edge of said washer towards said second plate;

said means for sealing said chamber further comprises a gasket connected to said radially inner edge of said washer and between said radially inner edge of said washer and said second plate;

said third plate comprises a third disc-shaped plate having a central opening therein, said third disc-shaped plate having a radially inner edge disposed towards said hub and a radially outer edge disposed in said annular groove;

said third disc-shaped plate further comprises semi-circular openings therein disposed circumferentially about said third disc-shaped plate adjacent said radially outer edge;

said means for connecting together said first flywheel means and said second flywheel means comprises a plurality of springs disposed in said semi-circular openings;

said third disc-shaped plate comprising contact surfaces adjacent said semi-circular openings for contacting ends of said springs;

at least one of said first disc-shaped plate and said second disc-shaped plate also comprising contact surfaces for contacting ends of said springs;

said springs comprising torsional damping means for damping torsional changes between said first and second flywheel means;

said fourth plate comprises a fourth disc-shaped plate having a central opening therein, said fourth disc-shaped plate having a radially inner edge disposed towards said hub and a radially outer edge disposed away from said hub;

said means for non-rotationally connecting said third plate to said fourth plate comprises rivet means, said rivet means for connecting said radially inner edge of said third disc-shaped plate to said radially inner edge of said fourth disc-shaped plate;

said flywheel device comprises a flywheel device for outputting mechanical rotary power to a friction clutch, the friction clutch comprising:
  a housing;
  clutch hub means disposed within said housing
  a friction disc disposed about said clutch hub means within said housing;
  said friction disc comprising friction linings for frictionally engaging said fourth disc-shaped plate to receive mechanical rotary power from said flywheel device;
  pressure plate means for pressing said friction linings into engagement with said fourth disc-shaped plate;
  biasing means for applying pressure to said pressure plate means to press said friction linings into engagement with said fourth disc-shaped plate;
  means for connecting said housing to said fourth disc-shaped plate;

said radially outer edge of said fourth disc-shaped plate comprising means for connecting said fourth disc-shaped plate to said housing of said friction clutch;

said fourth disc-shaped plate comprises an axial surface for engaging with said friction linings of said friction clutch;

said hub of said flywheel device comprises an end disposed radially within said inner radial edge of said fourth disc-shaped plate;

said hub comprises an exterior surface disposed towards said fourth disc-shaped plate;

said end of said hub comprises an annular notch in said exterior surface, said annular notch having an external radius;

said hub further comprises a ring-shaped member disposed adjacent said end thereof, said ring-shaped member having an external radius greater than the external radius of said notch of said hub to define an axial edge of said notch;

said radially inner edge of said fourth disc-shaped member comprising an annular projection for engaging in said notch of said hub;

said first disc-shaped plate comprises a closable opening therein for adding lubricating medium to said chamber;

said flywheel device comprises plug means for closing said opening for adding said lubricating medium to said chamber;

said ring-shaped connecting member is welded to said first and second disc-shaped plates; and one of: said first disc-shaped plate, said second disc-shaped plate and said ring-shaped connecting member comprises circumferential toothing disposed thereabout for engaging with a starter of an internal combustion engine.

* * * * *

UNITED STATES PATENT AND TRADEMARK OFFICE
CERTIFICATE OF CORRECTION

PATENT NO.   : 5,569,088
DATED        : October 29, 1996
INVENTOR(S)  : Bernhard SCHIERLING, Ralf TILL and Jörg SUDAU It is certified that error appears in the above-indentified patent and that said Letters Patent is hereby corrected as shown below:

On the title page, item [54], before 'THRUST', delete "SEPERATE" and insert --SEPARATE--.

In column 1, line 3 of the title, before 'THRUST', delete "SEPERATE" and insert --SEPARATE--.

Signed and Sealed this

Twenty-fifth Day of February, 1997

Attest:

BRUCE LEHMAN

*Attesting Officer*     *Commissioner of Patents and Trademarks*